Patented Apr. 12, 1932

1,853,565

UNITED STATES PATENT OFFICE

ALPHONS O. JAEGER AND JOHANN A. BERTSCH, OF ST. LOUIS, MISSOURI, ASSIGNORS TO THE SELDEN COMPANY, OF PITTSBURGH, PENNSYLVANIA, A CORPORATION OF DELAWARE

RESIN

No Drawing. Application filed April 12, 1926, Serial No. 101,560. Renewed February 19, 1932.

This invention relates to a process of preparing resins from crude solvent naphtha and other crude aromatic hydrocarbons and heavy solvents.

The preparation of coumarone and indene resins from solvent naphtha and similar fractions as well as from benzol plant residues and other products obtained from coal tar or coal gas condensates has been effected hitherto by removing some of the impurities from the raw material by means of a concentrated sulfuric acid wash followed by polymerization of the coumarone and indene bodies with acid. The resins which have been produced hitherto have been for the most part unsatisfactory owing to the fact that they contain impurities which darken them. These impurities such as cyclopentadiene, styrolene and the like are not completely removed with concentrated sulfuric acid and are polymerized together with the coumarone and indene by subsequent acid treatment. A further objection to this method of preparing coumarone and indene resins lies in the fact that the impurities which are removed by washing with sulfuric acid are in a form in which they are for the most part commercially worthless and thus constitute a total loss.

The present invention has for its object the production of high grade light colored coumarone and indene resins and similar products from crude solvent naphthas and the like and at the same time removing impurities in a form in which they can be used commercially. Other objects and advantages of the present invention will appear from the more detailed description to follow.

With these and other objects in view, the present invention includes the purification of crude solvent naphtha and similar fractions by a partial or selective halogenation with or without a partial acid or alkali wash. The method of purifying crude aromatic hydrocarbons by selective halogenation alone is described and claimed in the co-pending application of Alphons O. Jaeger, Serial No. 86,099, filed Feb. 4, 1926, which has matured into Patent 1,741,305, and the process in which sulfuric acid wash is combined with selective halogenation forms the subject-matter of the co-pending application of Alphons O. Jaeger, Serial No. 101,561, filed April 12, 1926.

In the present application, we do not claim these purification methods generally as applied to the purification of aromatic hydrocarbons, and on the contrary these methods are claimed in the present application only in so far as they are used to produce coumarone and indene resins or similar products.

According to the present invention, crude solvent naphtha and similar fractions with or without removal of phenols and bases by alkali and acid treatment and with or without preliminary partial washing with concentrated sulfuric acid, are subjected to a partial halogenation with active halogen under which term is included chlorine or bromine, iodine being relatively inactive in the present process. The halogen, which may advantageously be introduced in the presence of halogen carriers, preferentially attacks the unsaturated and saturated aliphatic and alicyclic compounds, such as paraffins, hydrindene, cyclopentadiene, dicyclopentadiene, styrolene and the like, as well as some other heavy oils which are halogenated and transformed into high boiling halogen products. Sulfur compounds such as thioxene are also decomposed and transformed for the most part into high boiling compounds. The coumarones and indenes, as well as the aromatic hydrocarbons such as xylenes, pseudocumenes, propylbenzene, ethyl toluene, cymenes, durenes, and the like are practically unattacked. The aromatic hydrocarbons are then separated by distillation and are produced in a very pure form as has been described in the co-pending applications, referred to above. It is an important advantage of the present invention that not only are the resins produced in excellent yield and in a particularly useful form, but the aromatic hydrocarbons are at the same time produced in a highly purified state, being substantially free from sulfur compounds of all kinds and excellently suited for use in catalytic reductions or for the production of derivatives for use in such catalytic processes. The present process is, therefore, in no sense a compromise between good yields of high grade resin and good yields of pure aromatic hydrocarbons. On the contrary, the process effects important improvements in the production of both products.

After removing the halogen impurities which are for the most part in such form as to be commercially useful as solvents and the like, the purified solvent naphtha is subjected to acid polymerization by means of concentrated sulfuric acid, phosphoric acid, aluminum chloride, zinc chloride or similar polymerizing and condensating agents. Heat and pressure, are favorable and may be used. The coumarone and indene bodies are simply and easily polymerized to form light colored and in some cases almost colorless resins of excellent physical and chemical properties and are in marked contrast to the black or dark resins resulting from the polymerization of fractions which have been purified by the sulfuric acid wash process and which are frequently of very poor physical character.

The polymerization which is exothermic can advantageously be controlled by cooling in order to prevent side reactions. The quality of the resins produced, of course, depends in very large measure on the completeness of the condensation and polymerization and by a suitable adjustment of the operating conditions, resins of varying degrees of hardness and iodine number can be produced. The resins after polymerization are washed with water and alkali until neutral to litmus and the aromatic hydrocarbons are distilled off using a vacuum if necessary. The resins may be freed from naphthalene or similar products by distillation with steam. The aromatic hydrocarbons distilled off can, of course, be used for the usual purposes and in addition, possess the advantage that they are substantially free from sulfur and can be used as the raw material for catalytic reductions or for derivatives to be used in catalytic reductions.

In many cases, particularly where the concentration of resinifiable compounds is very high, it is desirable to dilute the purified solvent naphtha or similar fraction with low boiling aromatic hydrocarbons or with indifferent solvents such as carbon tetrachloride, before commencing polymerization. This is particularly advantageous in the case of very viscous products such as benzol plant residues and the like and it is even desirable in such cases to effect the dilution or solution before treating with halogen.

The best results are usually produced by separating the halogenated impurities before commencing polymerization, but this is not necessary in all cases and it is sometimes desirable to omit the distillation of the coumarones and indenes and to polymerize these bodies in the halogenated solvent naphtha solution without removing impurities, using the usual polymerizing agents. Obviously, of course, the partial removal of impurities before polymerization may also be effected and the invention is not to be limited to any particular degree of purification. As pointed out, however, the best results in most cases are obtained when the removal is substantially complete.

The purification by selective halogenation may take place at elevated temperature or in the cold, with or without pressure, as a continuous or a discontinuous process or in any other suitable manner. Many halogenation processes are described in the co-pending applications referred to above and all of them can be used in the present process. Any of the halogenating agents referred to in the above mentioned applications may be used, such as gaseous or liquid chlorine, phosgene, bromine, various compounds which give off chlorine, or bromine, hydrochloric or hydrobromic acid in the presence of oxidizers and the like. Liquid chlorine is particularly suitable as it effects a cooling of the reaction mixture due to the latent heat of vaporization, which cooling is frequently very desirable as the purification process is for the most part an exothermic one and too great rise in temperature is undesirable and brings about losses due to the halogenation of aromatic hydrocarbons and other products which are intended to remain unattacked.

A large number of halogen carriers may be used to increase the effectiveness of halogen. These carriers as listed in the above-mentioned applications include sulfur and many sulfur compounds of various kinds, e. g., sulfur halides, sulfuryl chloride, thionyl chloride, benzene sulfochloride, and homologues, which preferentially catalyze the reaction of acyclic, alicyclic and heterocyclic compounds; iron in the form of the metal or chloride or bromide, antimony, and antimony compounds, and particularly aluminum, aluminum halides, halides of tin, gold, tellurium, zirconium, uranium, vanadium, bismuth, molybdenum and zinc, as well as animal charcoal, wood charcoal and others may be used as halogen carriers. Although many in this latter group are not very selective, they are nevertheless useful in the process of my invention by reason of the fact that the acyclic, alicyclic and heterocyclic impurities are more readily chlorinated than are the aromatic compounds. Care should be taken, of course, not to use a halogen carrier which is a strong polymerizing agent in order to prevent losses due to the polymerization of coumarones and indenes during purification.

The resins produced by the polymerization of solvent naphtha and similar fractions purified by means of partial halogenation, constitute new chemical individuals and are not to be confused with the dark colored resins produced by polymerizing solvent naphtha which has been purified by sulfuric acid. The resins of the present invention are substantially free from the impurities which bring about strong coloration in the acid purified products used hitherto and also contain small amounts of halogenated impurities which may be present as a mixture or may to some extent form chemical compounds with the resin. The molecular weight and iodine number of the resins are not characteristics which distinguish the resins of the present invention from those which have hitherto been produced, since both the molecular weight and the iodine number depend in the main on the extent to which polymerization has taken place and are not primarily affected by the method of purification used. Resins of various molecular weights and iodine number can therefore be produced by the present invention and may vary in their physical characteristics from hard, brittle resins down to fluid or viscous resins. The intermediate degrees such as hard, medium and soft resins can also be produced by a suitable control of the polymerization and condensation. The distinction between the new resins of the present invention and those which have been produced hitherto lies not in the extent to which the polymerization and condensation has been carried but rather to the substantial absence of color forming impurities and the presence of minute amounts of halogen bodies.

The invention will be described in greater detail in the following specific examples which illustrate typical modifications of the invention for the use with particular raw materials. The invention is not to be considered as limited to the details of the specific examples, although in its narrower aspects, it includes as features some of the specific advantages which may be present in certain modifications described in the examples.

Example 1

Benzol plant residues are dissolved in a solvent such as solvent naphtha or similar solvent which is relatively unaffected by halogen, for example carbon tetrachloride or nitrobenzol. After solution is complete, the mixture is subjected to partial chlorination with elementary chlorine, phosgene or a substance giving off chlorine. In most cases, 2-5% chlorine is sufficient. Bromine is added in small quantities as a catalyst or a chlorine carrier. After halogenation is complete, the product is washed with water and the solvent naphtha distilled off. The distillate is then further heated and steam or inert gas is passed through the liquid to remove oils or naphthalene. The higher the heat, the greater the polymerization due to the heat and correspondingly, the higher the melting point of the resins which will result. In general, however, the heat should not be carried above 270° C. in order to prevent undesirable darkening of the resins. A portion of the chlorinated products are removed, the amount depending on the temperature used, or some of them may be polymerized together with the coumarone and indene products present. The resulting resins are dried and vary from very light to brownish, whereas resins produced without chlorination are deep brown to black. The improved characteristics and better color of the resins are probably due to the removal of the strongly unsaturated compounds such as dicyclopentadiene, styrolene, hydrindene and the like which tend to blacken when polymerized at high temperatures and which are partially or wholly inactivated by the chlorine.

Example 2

A solvent naphtha fraction of 150-180° C. is treated with from 1-3% of chlorine or an equivalent amount of bromine. The chlorine or bromine is preferably in gaseous form diluted with an inert gas or with steam. 1-3% of calcium carbonate is added in order to neutralize the hydrochloric acid formed during chlorination. After chlorination is complete, the solvent naphtha is distilled off from the higher boiling chlorinated bodies and in the case of bromine, brominated bodies, and the solvent naphtha thus purified and containing large amounts of coumarone and indene bodies is polmerized with a combination of heat and pressure, either continuously or discontinuously. Solvents such as lower boiling benzols purified with halogen may be added in order to increase the pressure and thus produce a higher melting resin. Good resins are produced at a temperature of 280° C. and under 5 to 20 atmospheres pressure.

Example 3

A crude solvent naphtha fraction boiling between 150-180° C. is washed with alkali and sulfuric acid in the usual manner in order to remove phenols and bases and is then subjected to partial chlorination by passing in gaseous chlorine or phosgene with vigorous agitation and adequate cooling. Some iron filings may advantageously be added as a catalyst. The partial chlorination is completed when a sample shows no coloration in the sulfuric acid test. The amount of chlorine which must be used depends on the character of the solvent naphtha and in general varies from 2 to 4%. In order to protect the walls of the vessel, small amounts of soda or calcium carbonate are to be added in order to neutralize free hydrochloric acid which is formed during the reaction.

The reaction product after chlorination is complete is washed with water and distilled, giving a water clear distillate which is then polymerized by means of sulfuric acid, 0.4–1% of 63–65° Bé. sulfuric acid being added, and the temperature of the liquid being kept below 25° C. by suitable cooling. If proper cooling means are not employed, the strong exothermic polymerization may result in considerable heating of the liquid which in the presence of strong sulfuric acid results in the discoloring of the coumarone and indene resins. The product is then neutralized by washing with water or alkali and water and distilled in a vacuum to remove the unpolymerized aromatic hydrocarbons. A little superheated steam is finally blown through and an almost completely colorless and valuable resin is produced which is eminently suited for varnish purposes.

The residue of chlorinated impurities can be used as a solvent or can be used as a raw material for resins depending on its consistency.

*Example 4*

A crude solvent naphtha fraction boiling between 140–160° C. is freed from phenols and bases and is then subjected to a short washing with strong sulfuric acid, using about 0.3–0.6% of 63–65° Bé. sulfuric acid. The washing should last about 15–20 minutes and the acid is then removed as completely as possible.

The product from this sulfuric acid wash still gives a strong dark brown color in the standard sulfuric acid test. The washed product is given a short wash with water and 4–5% of chlorine is passed in with violent agitation using a thin stream of liquid chlorine which is introduced below the surface. Paraffins, dicyclopentadiene, styrolene, hydrindene, thioxenes and similar impurities are transformed into higher boiling chlorinated products, whereas coumarones and indenes are hardly attacked at all. The product is washed in the usual manner with water and the solvent naphtha distilled off in the form of a colorless oil which gives no color with concentrated sulfuric acid. The solvent naphtha, thus purified, is polymerized with heat or heat and pressure or concentrated sulfuric acid or aluminum chloride may be used. After the polymerization is complete, the aromatic hydrocarbons are distilled off from the coumarone and indene resins using a vacuum, if necessary. Blowing with steam or inert gases is frequently advantageous for the removal of naphthalene from the liquid resin. The coumarone and indene resins thus produced are almost colorless and do not subsequently darken as they are free from sulfur compounds and are therefore excellently suited for varnish purposes.

*Example 5*

A light oil fraction boiling from 160–180° C. is freed from bases and phenols in the usual way and is washed once or twice with a total amount 0.5–1% of 65° Bé. sulfuric acid. After this short wash, the acid is very carefully washed out and the liquid is partially chlorinated by introducing gaseous chlorine diluted with carbon dioxide or nitrogen, the chlorination being continued until a sulfuric acid test of a sample gives practically no color. By this means, heavy, oily materials as well as the undesired impurities described in Example 4 are partly transformed into higher boiling chlorinated products so that when the mixture is distilled, an almost colorless, heavy benzol is obtained. The further treatment of the purified heavy benzol is carried out as described in Example 4. Naphthalene may be removed from the resins produced by blowing superheated steam through the mixture.

*Example 6*

A light oil fraction boiling from 140–170° C. is freed from phenols and bases in the usual manner and gaseous chlorine is introduced with vigorous stirring in the presence of benzolsulfochloride as a catalyst, the chlorination being continued until a sulfuric acid color test of the product gives negative results, which means that the strong unsaturated compounds are transformed into chlorinated products.

The reaction mixture thus obtained is directly treated with 0.6–1% of 62–66° Bé. sulfuric acid with agitation which is continued until a resin of the desired consistency is obtained. The mixture is then carefully washed alternately with water and alkali and the unpolymerized portions are distilled off, using a vacuum if desired. Naphthalene and traces of heavy oils can be removed by blowing steam or oil through the liquid resins, maintaining the same temperature used in distillation. On cooling, the resin is light yellow and is an excellent insulating compound.

*Example 7*

A solvent naphtha fraction of 130–160° C. is freed from phenols and bases in the usual manner and is then subjected to a column distillation, and gaseous chlorine, if desired diluted with carbon dioxide, nitrogen or steam, is introduced into the column in sufficient amount to effect selective chlorination. This process can, if desired, be made continuous and yields a distillate which is substantially free from the undesired impurities and which contains the resin forming bodies. Resins can be formed by continuous or discontinuous polymerization with acids, heat or pressure, yielding almost colorless resins of excellent characteristics. Solid chlorine carriers can be introduced in the form of fragrants into the column in order to accelerate the selective chlorination. For example, iron fragments or pumice fragments impregnated with copper or nickel salts may be used. These catalysts reduce the distilling time very materially. The by-products of the chlorination may be utilized as high boiling solvents.

The expression "crude coal tar distillate" used in the claims is intended to cover not only the actual distillates from coal tar but the similar products which are obtained, for example, by distillation from coke oven gases, benzol plant residues and the like. These products are similar in their general chemical composition and are intended to be included under the expression "crude coal tar distillate."

Throughout the specification and claims wherever percentages of sulfuric acid or chlorine are given without further definition it is to be understood that the percentages are by weight and not by volume.

Having thus described our invention what is claimed as new is—

1. A resinifiable mixture containing coumarone and indene bodies and being substantially free from unhalogenated acyclic, alicyclic and heterocyclic impurities and substantially free from hydrocarbons other than aromatic hydrocarbons and containing small amounts of halogen reacted hydrocarbon bodies.

2. A polymerized coumarone and indene resin being substantially free from unchlorinated acyclic, alicyclic and heterocyclic impurities, and containing small amounts of halogen reacted hydrocarbon bodies.

3. The process of preparing coumarone and indene resins which comprises treating a crude aromatic hydrocarbon fraction with just sufficient active halogen to react with substantially all of the acyclic, alicyclic and heterocyclic impurities and thereafter polymerizing the coumarone and indene bodies present and freeing them from admixed aromatic hydrocarbons.

4. The process according to claim 3 in which the halogenation takes place in the presence of a halogen carrier which preferentially catalyzes acyclic, alicyclic and heterocyclic halogenation selected from the group consisting of sulphur, sulfur-halogen compounds and metal halides.

5. The process according to claim 3 in which the halogenation takes place in the prescence of a relatively inert diluent.

6. The method of preparing polymerized coumarone and indene resins which comprises removing phenols and bases from crude coal tar distillates, washing the purified distillate with sufficient strong sulfuric acid to effect only a partial purification thereof, treating the partially acid purified distillate with sufficient active halogen to react with substantially all of the acyclic, alicyclic and heterocyclic impurities, polymerizing the coumarone and indene bodies present and removing therefrom admixed aromatic hydrocarbons.

7. The process according to claim 6 in which the sulfuric acid reacted impurities are substantially removed from the reaction mixture before selective halogenation.

8. The process according to claim 3 in which the halogen reacted impurities are removed from the reaction mixture before polymerization.

9. The process according to claim 3 in which aromatic hydrocarbons and volatile impurities are removed from the polymerized coumarone and indene resins by distillation and the temperature and pressure during distillation are controlled so as to permit evaporation of the volatile constituents but so as to avoid substantial injury to the coumarone and indene resins.

10. The process according to claim 3 in which sufficient base is added to the reaction mixture to neutralize acid set free by selective halogenation.

11. The method of preparing polymerized coumarone and indene resins which comprises treating a crude aromatic hydrocarbon mixture containing coumarone and indene bodies and acyclic, alicyclic or heterocyclic impurities with liquid chlorine in amount sufficient to react with substantially all of the acyclic, alicyclic and heterocyclic impurities without substantially attacking the aromatic hydrocarbons, the reaction taking place under sufficient agitation to produce a uniform reaction and maintain a low temperature by evaporation of the liquid chlorine during reaction and subsequently polymerizing the coumarone and indene bodies.

Signed at St. Louis this 8th day of April, 1926.

ALPHONS O. JAEGER.
JOHANN A. BERTSCH.